United States Patent [19]

Kayser

[11] Patent Number: 4,628,431
[45] Date of Patent: Dec. 9, 1986

[54] POWER SUPPLY ON/OFF SWITCHING WITH INRUSH LIMITING

[75] Inventor: Dennis J. Kayser, Hudson, N.H.

[73] Assignee: Wang Laboratories, Inc., Lowell, Mass.

[21] Appl. No.: 681,156

[22] Filed: Dec. 12, 1984

[51] Int. Cl.$^4$ .......................................... H02H 7/125
[52] U.S. Cl. ...................................... 363/49; 363/53; 323/901; 323/908
[58] Field of Search ............................ 363/49, 52, 53; 323/901, 908; 307/64, 65, 66; 361/21, 31, 58

[56] References Cited

U.S. PATENT DOCUMENTS

| | | | |
|---|---|---|---|
| 3,193,711 | 7/1965 | Western | 323/901 |
| 4,236,198 | 11/1980 | Ohsawa et al. | 323/908 |
| 4,271,460 | 6/1981 | Baker | 323/908 |
| 4,321,447 | 3/1982 | Lamb | 328/908 |

*Primary Examiner*—Peter S. Wong
*Assistant Examiner*—Judson H. Jones
*Attorney, Agent, or Firm*—Michael H. Shanahan; Gary D. Clapp; Scott K. Peterson

[57] ABSTRACT

A power switching means for connecting a power source to a digital data processing system. The switching means includes a power switch for connecting the power source to the system and two control switches. A first control switch determines whether system power is to be turned on or off and is responsive to a turn-on selection signal to provide an initial turn-on signal to the power switch if a power turn-on is to be performed. The second control switch is responsive to a power turn-on/turn-off initialization signal to initiate and control the turn-on and turn-off operations. The second control switch is responsive to the initialization signals at power turn-on to enable the first control switch to be responsive to a power-on selection signal to provide the initial turn-on signal to the power switch. The second control switch thereafter provides a sustaining signal to the power switch during the period in which power is to be provided to the system and is responsive a subsequent initialization signal to terminate the sustaining signal to the power switch, thereby turning off system power. The power switching means further includes a current limiter connected between the power source and the system to limit inrush current during power turn-on and the second switch further includes a bypass switch for providing a low resistance path around the current limiting means during system power on state.

6 Claims, 1 Drawing Figure

POWER SUPPLY ON/OFF SWITCHING WITH INRUSH LIMITING

BACKGROUND OF THE INVENTION

1. Field of the Invention

The present invention relates to a power supply on/off switching means and, in particular, to a power supply switching means offering inrush current limiting and increased reliability.

2. Description of the Prior Art

A recurring problem of digital data processing systems is that of power supply failure resulting in a loss of data, including system operating state. At best, such a failure may require the reloading of data and programs and, at worst, may result in an irretrievable data loss.

The two major sources of system power supply failure are the power supply itself and the means for controlling the turn-on and turn-off of the power supply. In general, failures of the power supply may be guarded against by the provision of alternate system power sources, such as battery back-up systems, which can provide power to a system for the period necessary to close the system down without data loss.

The second problem, failure of the power supply on/off control means, is in certain respects more difficult to guard against in that many such failures occur while the system power is in a dynamic, transient state, that is, during turn-on or turn-off.

Should a failure occur during this transient state, a battery back-up system may not be able to prevent the loss of data. As such, it is preferable for a power system to fail while it is in a stable state, that is, either to fail to turn on or to fail while on rather than failing during turn-on or turn-off.

The two principle sources of power supply control failure are, first, the normal, expected failure of components and, second, the failure of components due to increased stress during system turn-on and turn-off. As an example of the latter, current surge occurring during turn-on of a power supply can, for example, cause power supply rectifiers to fail. In the prior art, inrush current has customarily been limited by the use of current limiting elements in the power input line, such as thermistors and resistors switched by triacs. The disadvantages of such devices are that thermistors remain in the power line, thereby dissipating power, while switching triacs are active devices and are required to carry the full input current to the power system during the entire time the system is on.

SUMMARY OF THE INVENTION

The present invention relates to a power switching means for connecting a power source to a digital data processing system. The switching means includes a power switch for connecting the power source to the system and two control switches. A first control switch determines whether system power is to be turned on or off and is responsive to a turn-on selection signal to provide an initial turn-on signal to the power switch if a power turn-on is to be performed. The second control switch is responsive to a power turn-on/turn-off initialization signal to initiate and control the turn-on and turn-off operations. The second control switch is responsive to the initialization signals at power turn-on to enable the first control switch to be responsive to a power-on selection signal to provide the initial turn-on signal to the power switch. The second control switch thereafter provides a sustaining signal to the power switch during the period in which power is to be provided to the system and is responsive a subsequent initialization signal to terminate the sustaining signal to the power switch, thereby turning off system power. The power switching means further includes a current limiter connected between the power source and the system to limit inrush current during power turn-on and the second switch further includes a bypass switch for providing a low resistance path around the current limiting means during system power on state.

Only one active circuit element, the power switch, is required to operate in the active state when power is supplied to the system. The other two active elements, the first and second control switches, are normally in the non-active state and are active only momentarily when power is being turned on or off. Thus a failure of the control switches will not result in a loss of power to the system, but only an inability to turn the system on or off. Moreover, elements such as relays tend to fail into their normally inactive state, so that a failure of the control switches will not alter the existing operating state of the system. In addition, the design of of the power switching means allows the use of a switched current limiting element and the consequent reduction in power dissipation for comparatively little additional cost.

Other objects and advantages of the present invention will be understood by those of ordinary skill in the art after referring to the following detailed description and the drawings, wherein:

DESCRIPTION OF A PREFERRED EMBODIMENT

Figure 1:
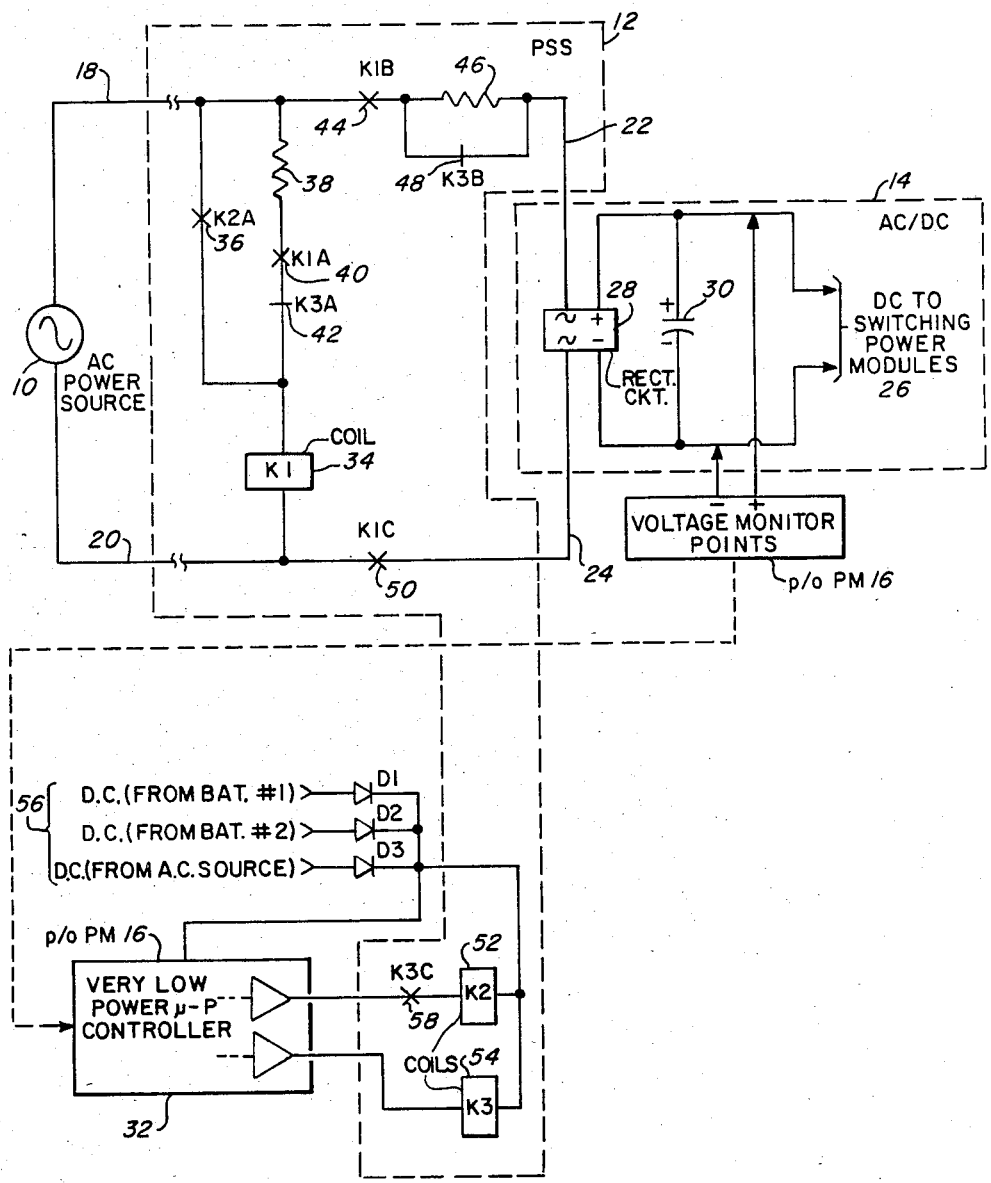
FIG. 1 is a diagrammic representation of a power supply on/off switching system incorporating the present invention.

The exemplary power system shown herein includes, in the power switching circuitry which is the subject of the present invention, a plurality of relays and the relay circuitry therein is represented in the standard convention. That is, a relay control coil is indicated by a rectangle connected in the lines providing control power to the relay coil and is designated by the combination of the letter K followed by a number, for example, K1, K2 or K3. Relay switching contacts are indicated by either straight bars or Xs imposed across the lines switched by the relay contacts. A bar indicates a normally closed contact, that is, one which is closed when the corresponding relay coil is not energized, while an X indicated a normally open contact, that is, one which is open when the the corresponding relay coil is not energized. The relationship between relay contacts and the corresponding control coils is indicated by the references applied to the contacts. Each such reference is comprised of the corresponding coil reference, for example, K1, with the addition of a letter designator, such as A, to indicated a particular contact controlled by that relay coil. For example, contact A controlled by relay K1 is designated by the reference K1A, while contact C of that relay would be designated by the reference K1C.

Referring to FIG. 1, the exemplary power system is shown as including an A.C. Power Supply (PS) 10, Power System Switching Circuitry (PSS) 12, AC to DC Conversion Circuitry (AC/DC) 14, and Power Monitor Circuitry (PM) 16. PS 10 is connected to and provides AC power to PSS 12 through lines 18 and 20. PSS 12, which controls the provision of power to the system and which is described in further detail below, is connected to and provides power to AC/DC 14 through lines 22 and 24.

AC/DC 14 as shown herein is exemplary and representative of the type of circuitry, well known in the art, which converts AC power to raw DC power and provides that DC power to, for example, DC switching power supplies 26 which in turn provide filtered, regulated power to the system. AC/DC 14 may be comprised, for example, of a rectifier circuit 28 or a transformer and rectifier circuit and may include a filter capacitor 30. In alternate embodiments, for example, those wherein the system power supplies accept AC power input, AC/DC 14 is not necessary and may be replaced, for example, by a transformer for voltage level conversion and may be replaced by simple power busses.

PM 16, as indicated in FIG. 1, essentially monitors the power output of AC/DC 14 and provides signals indicated the current state of power to the system. In the present example, this information is used by PM 16's microprocessor power Controller 32 to control certain aspects of the operation of PSS 12, again as described below. Controller 32 may also, in the exemplary system, receive system operator inputs indicating when the system operator wishes to turn system power on and off and, as described below, would provide the appropriate control outputs to PSS 12. It should be noted that Controller 32 may also be comprised of other conventional power control type circuitry as is well known in the art, for example, rotary on-off sequencing switches or an electromagnetic timer switch.

As indicated in FIG. 1, PSS 12 includes three relays, K1, K2 and K3. Relay K1 is the power switching relay which controls the provision of AC power to the system while K2 and K3 control the turn-on and turn-off of K1. As described below, relay K3 initiates turn-on and turn-off operations while relay K2 controls whether a turn-on or turn-off operation is to be performed.

As shown in FIG. 1, relay K1 coil (K1) 34 is connected to line 20 and is connected from line 18 through a two branch parallel circuit. The first branch is comprised of relay K2 normally open contact A (K2A) 36, which provides initial turn-on current to K1 34. The second branch is comprised the series combination of current limiting Resistor 38, relay K1 normally open contact A (K1A) 40 and relay K3 normally closed contact A (K3A) 42, which provide sustaining current to K1 34 during the period that system power is on.

PSS 12 input line 18 is connected to output line 22 to AC/DC 14 through the path comprised of relay K1 normally open contact B (K1B) and the parallel circuit comprised of current limiting Resistor 46 and relay K3 normally closed contact B (K3B) 48. PSS 12 input line 20 is connected to output line 24 to AC/DC 14 through relay K1 normally open contact C (K1C) 50.

Relay K2 coil (K2) 52 and relay K3 coil (K3) 54 are provided with power from a Source 56 comprised of the parallel combination of the DC output of AC/DC 14 and, preferably, one or more battery supplies. The power from AC/DC 14 serves as the sustaining power source during normal system on operation while the the battery sources provide initial power at system turn-on and in the event of a system power failure. As indicated in FIG. 1, K3 54 is further connected directly to a control output of Controller 32 while K2 52 is connected to a control output of Controller 32 through relay K3 normally open contact C (K3C) 58.

Having described the structure of PSS 12, the operation of PSS 12 is described next below through a step by step description of PS 12 during system power turn-on and during system power turn-off.

Considering first a power turn-on operation, a turn-on request is submitted to Controller 32 by an operation, for example, from a front panel control, from a time controller or through a remote controller, such as a phone line link. At this time, power is supplied to K2 52, K3 54 and controller 32 from a battery supply in Source 56.

As a result of the turn-on request, Controller 32 provides a power on/off initialization signal which energizes K3 54. The energization of K3 54 in turn results in the activation of normally open K3C 58 so that K2 52 can be energized by Controller 32. The energization of K3 54 also results in the activation of normally closed K3B 48, so that the AC power path from line 18 to line 22 is through Resistor 46, and the activation of normally closed K3A 42 to open that path from K1 34 to line 18.

Controller 32 then provides a power on/off selection signal which energizes K2 52 through now closed K3C 58, so that normally open K2A 36 is activated to the closed state. The closing of K2A 36 provides AC input power to K1 34 from line 18, thereby energizing K1 34.

The energization of K1 34 results in the activation of normally open K1B 44 and K1 C 50 so that AC power is provided through lines 18 and 20 to line 22 and 24 into AC/DC 14 and the system. It should be noted that, due to the activation of K3 54, K3B is open, as described above, so that current to the system passes through Resistor 46, thereby limiting inrush current.

The energization of K1 34 also results in the activation of K1A 40, so that this path to K1 34 is closed, except for K3A 42.

When Controller 32 determines that the output voltage levels of AC/DC 14 have reached the proper level, Controller 32 de-energizes K3 54. As a result, K3A 42 returns to the normal closed state, so that sustaining power is provided to K1 34 from line 18 through the path comprising Resistor 38, activated and closed K1A 40 and deactivated and closed K3A 42. It should be noted that Resistor 38 is not required, but is normally provided to reduce power consumption in K1 34 as the sustaining current of a relay is less than its initial energization current, which was provided through K2A 36.

K3B 48 also returns to the normally closed state at this time, so that AC power to AC/DC 14 is provided through the path comprising K3B 48 rather than through current limiting Resistor 46. K3B 48 thereby essentially operates as a bypass path so that Resistor 46 is connected in the path from line 18 to line 22 only during system power turn-on and, as described below, system turn-off. K3B 48 thereby operates as a low resistance bypass path to substantially reduce power dissipation in Resistor 46 during normal system power-on state.

Finally, K3C 58 returns to the normally open state, thereby de-energizing K2 52. The de-energization of K2 52 in turn returns K2A 36 to the normally open state but, as described above, sustaining current is now provided to K1 34 through Resistor 38, K1A 40 and K3A 42 and K1 34 remains energized so that AC power continues to be provided to the system through K1B 44 and K1C 50. The system power turn-on operation is now completed and power will continue to be provided to the system until a turn-off operation is initiated, as described next below.

At the initiation of a turn-off operation, Controller 32 again energizes K3 54, which in turn activates K3A 42 and K3B 48 to their open states. The opening of K3A 42 interrupts the sustaining current to K1 34, so that K1B 44 and K1C 50 return to their normal open state and AC power to AC/DC 14 and the system is terminated. K1A 40 also returns to the normally open state, so that the sustaining current path to K1 34 will remain open and K1 34 de-energized when K3A 42 later returns to the normally closed state.

The opening of K3B 48 again forces any current flowing through line 22 during the turn off operation to pass through Resistor 46. Resistor 46 will therefore additionally act as a current limiter during turn-off, for example, if AC/DC 14 includes inductive elements such as a transformer.

The above described energization of K3 54 will also result in the activation of K3C 58 to the closed state. Controller 32 does not, however, energize K2 52 during a turn-off operation, so that K2A 36 remains in the open state and K1 34 remains de-energized.

Finally, Controller 32 de-energizes K3 54 and K3B 48 and K3A 42 return to the normally closed state while K3C 58 returns to the normally open state. PSS 12 is then in the same state as before the previously described turn-on operation.

It should be noted from the above description of PSS 12 that only one active circuit element, relay K1, is required to operate in the active state when power is supplied to the system. The other two active elements, relays K2 and K3, are normally in the non-active state and are active only momentarily when power is being turned on or off. Thus a failure of relays K2 or K3 will not result in a loss of power to the system, but only an inability to turn the system on or off. Moreover, elements such as relays tend to fail into their normally inactive state, so that a failure of relay K2 or K3 will not alter the existing operating state of PSS 12. As a result of these considerations, the reliability of PSS 12 is enhanced and the possible undesirable effects of a circuit element failure are significantly reduced. In addition, the design of PSS 12 as shown in FIG. 1 allows the use of a switched current limiting element, that is, Resistor 46, and the consequent reduction in power dissipation for comparatively little additional cost, that of contact K3B 48.

The invention described above may be embodied in yet other specific forms without departing from the spirit or essential characteristics thereof. Thus, the present embodiment is to be considered in all respects as illustrative and not restrictive, the scope of the invention being indicated by the appended claims rather than by the foregoing description, and all changes which come within the meaning and range of equivalency of the claims are intended to be embraced therein.

What is claimed is:

1. Power switching means for selectively connecting a power source to a digital data processing system, comprising:
  (A) first switching means for connecting the power source to the system,
  (B) means for providing a power on selection signal,
  (C) second switching means for providing an initial turn-on signal to the first switching means in response to receiving an enabled power on selection signal, and
  (D) third switching means having an active state and a normal state and
    (1) arranged when in the active state to enable the second switching means to be responsive to the power on selection signal, and
    (2) arranged when in the normal state to provide a sustaining signal to the first switching means.

2. The power switching means of claim 1, further comprising:
  (E) current limiting means connected between the power source and the system,
and wherein the third switching means is arranged when in the normal state to provide a low resistance path bypassing the current limiting means.

3. Power switching means for selectively connecting a power source to a digital data processing system, comprising:
  (A) first and second power conducting lines connected from first and second outputs of the power source and to first and second inputs of the system,
  (B) controller means for providing a power on/off initialization signal and a power on/off selection signal,
  (C) first switching means having a normal state and an active state and having
    (1) first and second normally open contact means connected respectively in the first and second lines for selectively allowing power to be provided to the system, and
    (2) a first activation means for placing the first switching means in the active state in response to signals received on first and second input lines, and having the first input connected to the second output of the power means, and
    (3) third normally open contact means connected from the first output of the power means for providing a sustaining signal to the first activation means,
  (D) second switching means having a normal state and an active state and having
    (1) fourth normally open contact means connected from the first output of the power means and to the second input of the first activation means for providing an initial turn-on signal to the first switching means, and
    (2) second activation means for placing the second switching means in the active state in response to signals received on first and second input lines, and having a first input connected from a DC power supply means, and
  (E) third switching means having a normal state and an active state and having
    (1) fifth normally closed contact means connected from the third contact means and to the second input of the first activation means for providing the sustaining signal to the first activation means,
    (2) sixth normally open contact means connected from the second input of the second activation means and to the selection output of the controller means, and
    (3) third activation means for placing the third switching means in the active state in response to signals received on first and second input lines, and having the first input connected from the DC power supply means and the second input connected to the initialization output of the controller means.

4. The power switching means of claim 3, wherein the third switching means is responsive to first a power on/off initialization signal for
   i. enabling the second switching means to be responsive to a power on selection signal to provide the first switching means initial turn-on signal, and
   ii. providing a sustaining signal to the first switching means during the period in which power is to be provided to the system, and wherein the third switching means is responsive to a subsequent power on/off initialization signal for terminating the sustaining signal to the first switching means.

5. The power switching means of claim 3, wherein:
   the power conducting lines further include current limiting means connected in series with one of the conducting lines, and
   the third switching means further includes seventh normally closed contact means connected in parallel with the current limiting means.

6. The power switching means of claim 5, wherein:
   the third switching means is responsive to each power on/off initialization signal for opening the seventh contact means during the period during which power to the system is being turned on.

* * * * *